(12) United States Patent
Mueller et al.

(10) Patent No.: US 11,876,351 B2
(45) Date of Patent: Jan. 16, 2024

(54) THERMALLY OPTIMIZED PRECHAMBER SPARK PLUG

(71) Applicant: Robert Bosch GmbH, Stuttgart (DE)

(72) Inventors: Bernd Mueller, Korntal-Muenchingen (DE); Matthias Blankmeister, Heiligenhaus (DE); Stephan Kaske, Sternenfels Diefenbach (DE); Thomas Steidten, Ludwigsburg (DE); Ugur Yilmaz, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/248,587

(22) PCT Filed: Dec. 1, 2021

(86) PCT No.: PCT/EP2021/083758
§ 371 (c)(1),
(2) Date: Apr. 11, 2023

(87) PCT Pub. No.: WO2022/128473
PCT Pub. Date: Jun. 23, 2022

(65) Prior Publication Data
US 2023/0378723 A1    Nov. 23, 2023

(30) Foreign Application Priority Data
Dec. 15, 2020 (DE) ............ 10 2020 215 946.7

(51) Int. Cl.
*H01T 13/32* (2006.01)
*H01T 13/36* (2006.01)
*H01T 13/54* (2006.01)

(52) U.S. Cl.
CPC ............. *H01T 13/36* (2013.01); *H01T 13/54* (2013.01)

(58) Field of Classification Search
CPC .............................. H01T 13/36; H01T 13/54
See application file for complete search history.

(56) References Cited

U.S. PATENT DOCUMENTS

| 2018/0019578 A1* | 1/2018 | Mukoyama ............. H01T 13/39 |
| 2019/0383258 A1* | 12/2019 | Kano ...................... H01T 13/32 |

(Continued)

FOREIGN PATENT DOCUMENTS

| DE | 102016206992 A1 | 10/2017 |
| DE | 102016120984 A1 | 5/2018 |

(Continued)

OTHER PUBLICATIONS

International Search Report for PCT/EP2021/083758, dated Mar. 7, 2022.

*Primary Examiner* — Elmito Breval
(74) *Attorney, Agent, or Firm* — NORTON ROSE FULBRIGHT US LLP; Gerard A. Messina

(57) ABSTRACT

A prechamber spark plug, including center and ground electrodes, a housing having an external thread, a cap arranged on the housing and together with the housing defines a prechamber, and an insulator which electrically insulates the center electrode from the housing. The external thread has a thread length in the axial direction. The housing is fastened to the insulator at first and second fixing regions so that a first clamping force at the first fixing region acts from the housing on the insulator, and a second clamping force at the second fixing region acts from the housing on the insulator. The first and second clamping forces are directed in opposite directions to one another in the axial direction. A distance between the first and second fixing regions in the axial direction defines a clamping length. A ratio between the thread length and the clamping length is between 0.7 to 1.3.

13 Claims, 2 Drawing Sheets

(56) References Cited

U.S. PATENT DOCUMENTS

2020/0083674 A1* 3/2020 Imai .................. H01T 13/08
2020/0412104 A1* 12/2020 Saito ................. H01T 13/36

FOREIGN PATENT DOCUMENTS

| DE | 102017107728 A1 | 10/2018 |
|----|-----------------|---------|
| DE | 102018209970 A1 | 12/2019 |
| WO | 03071644 A1 | 8/2003 |

* cited by examiner

THERMALLY OPTIMIZED PRECHAMBER SPARK PLUG

FIELD

The present invention relates to a robust and thermally optimized prechamber spark plug having a significantly reduced risk of thermal damage during operation. The present invention also relates to an internal combustion engine comprising such a prechamber spark plug.

BACKGROUND INFORMATION

Prechamber spark plugs are available in the related art in a variety of embodiments. Prechamber spark plugs are often used in internal combustion engines that are operated with gaseous media. Such prechamber spark plugs typically comprise a prechamber in which the center electrode and ground electrode are disposed. The prechamber is defined by a cap and a portion of the housing. Too high temperatures at the cap and/or at the electrodes can lead to undesirable and uncontrollable glow ignitions. On the one hand, this is undesirable because of increased wear and, on the other hand, it can result in worse exhaust emissions from the internal combustion engine. In the worst case, it can lead to substantial damage to the internal combustion engine. Improved heat dissipation in prechamber spark plugs is therefore absolutely necessary.

SUMMARY

A prechamber spark plug according to the present invention may have an advantage that too high temperatures, in particular in the region of the prechamber, can be avoided. It is in particular possible to reduce electrode temperatures, which, due to reduced wear on the electrodes of the prechamber spark plug, results in a long service life. The reduced temperatures also provide greater freedom when selecting a material for the electrodes, for example a material that has a lower thermal conductivity, as a result of which the costs for the electrodes can be reduced significantly. The prechamber spark plug furthermore exhibits improved internal tightness over its entire service life. The present invention also provides higher robustness with respect to improper handling, for example screwing in the prechamber spark plug with too high a torque, which can reduce or completely impair a sealing function of the prechamber spark plug making it possible for gases to escape from the combustion chamber into the atmosphere via leaky areas on the prechamber spark plug. According to an example embodiment of the present invention, this is achieved in that the prechamber spark plug comprises a center electrode and a ground electrode as well as a housing having an external thread. A cap is provided as well, which is disposed on the housing and together with a part of the housing defines a prechamber. The prechamber spark plug further comprises an insulator which electrically insulates the center electrode from the housing. The housing has a thread which extends in axial direction and is fastened to the insulator via a first and second fixing region. The fastening at the first and second fixing region is such that a first clamping force at the first fixing region acts from the housing on the insulator and a second clamping force at the second fixing region acts from the housing on the insulator. The two clamping forces are directed in opposite directions to one another in the axial direction of the prechamber spark plug. A distance between the first and second fixing region in axial direction defines a clamping length. The two opposing pretensioning forces thus achieve a pretensioning of the housing on the insulator. A ratio between the thread length and the clamping length is furthermore selected such that it is in a range of 0.7 to 1.3. This selection of the thread length and the clamping length in conjunction with the pretensioning of the housing makes it possible to achieve improved sealing over a wide temperature range, so that even the most stringent sealing requirements of the prechamber spark plug can be met. The position of the fixing regions, which is determined by the selection according to the present invention of the thread length and the clamping length, can moreover ensure that the inner sealing element of the prechamber spark plug is as far away from the combustion chamber as possible in the region of the colder cylinder head, as a result of which particularly advantageous conditions for cooling the prechamber spark plug prevail. This makes it possible to avoid thermal damage to components of the prechamber spark plug, in particular the electrodes. The selection according to the present invention of the thread length and the clamping length also supports the maintenance of the pretensioning on the housing over the service life of the prechamber spark plug. The improved sealing effect can thus be maintained over the service life of the prechamber spark plug.

Preferred further developments of the present invention are disclosed herein.

A further improvement of the prechamber spark plug of the present invention may be achieved when the ratio between the thread length and the clamping length is preferably in a range of 0.8 to 1.2. The ratio between the thread length and the clamping length is further preferably in a range of 0.8 to 1.

In order to achieve a pretensioning on the housing that is as uniform as possible, the first clamping force is preferably equal to the second clamping force. This achieves a uniform pretensioning of the housing.

The prechamber spark plug further preferably comprises respective slopes at the first and second fixing region, i.e., surfaces which are disposed at an angle to the center axis of the prechamber spark plug. This makes it possible to achieve a good adjustability of the two pretensioning forces at the first and second fixing region. The second fixing region, which is located on the side of the prechamber spark plug facing away from the combustion chamber, is particularly preferably formed on the insulator by means of a crimping method. The first and second fixing region are moreover preferably disposed on different diameters. The second fixing region is particularly preferably disposed on a larger diameter than the first fixing region. This reduces a surface of the housing facing the prechamber, so that less heat is introduced into the housing.

According to an example embodiment of the present invention, the prechamber spark plug further preferably comprises a sealing element between the housing and the insulator. The sealing element is preferably a sealing disk. The sealing element is particularly preferably disposed at the first fixing region. The application of the pretensioning force at the first fixing region preferably deforms, particularly preferably plastically deforms, the sealing element. The sealing element is particularly preferably disposed on a side of a radially inward facing flange on the housing which faces away from the combustion chamber, so that protection against high temperatures and in particular hot gases is provided.

The sealing element is preferably disposed at the first fixing region. Thus, when the housing is fixed to the insulator, the sealing element can be elastically deformed as well and seal a gap between the housing and the insulator. According to another preferred configuration of the present invention, the first fixing region is located in axial direction starting from the prechamber in the first half of the thread length.

According to an example embodiment of the present invention, the first fixing region is preferably disposed on an inner perimeter of the housing. The second fixing region is preferably disposed at an end of the housing facing away from the prechamber.

According to an example embodiment of the present invention, the first fixing region is preferably provided by an annular bead formed on the inner perimeter of the housing.

According to an example embodiment of the present invention, the thread length further preferably extends from a fastening region between the cap and the housing, i.e., an end of the housing on the combustion chamber side, to an abutment surface of the housing. The abutment surface is configured for abutment against an external component. The abutment surface is preferably perpendicular to a center axis of the prechamber spark plug. The abutment surface is, for example, configured to abut, directly or indirectly, against a cylinder head, for instance by placement of a sealing ring or the like.

The prechamber spark plug is preferably configured to be used in an internal combustion engine.

The present invention also relates to an internal combustion engine, in particular a mobile internal combustion engine, comprising a prechamber spark plug according to the present invention. The mobile internal combustion engine is preferably used in vehicles. The prechamber spark plug is in particular also intended for use in motor sports.

BRIEF DESCRIPTION OF THE DRAWINGS

A preferred design example of the present invention is described in detail in the following with reference to the figures.

DETAILED DESCRIPTION OF EXAMPLE EMBODIMENTS

Figure 1:
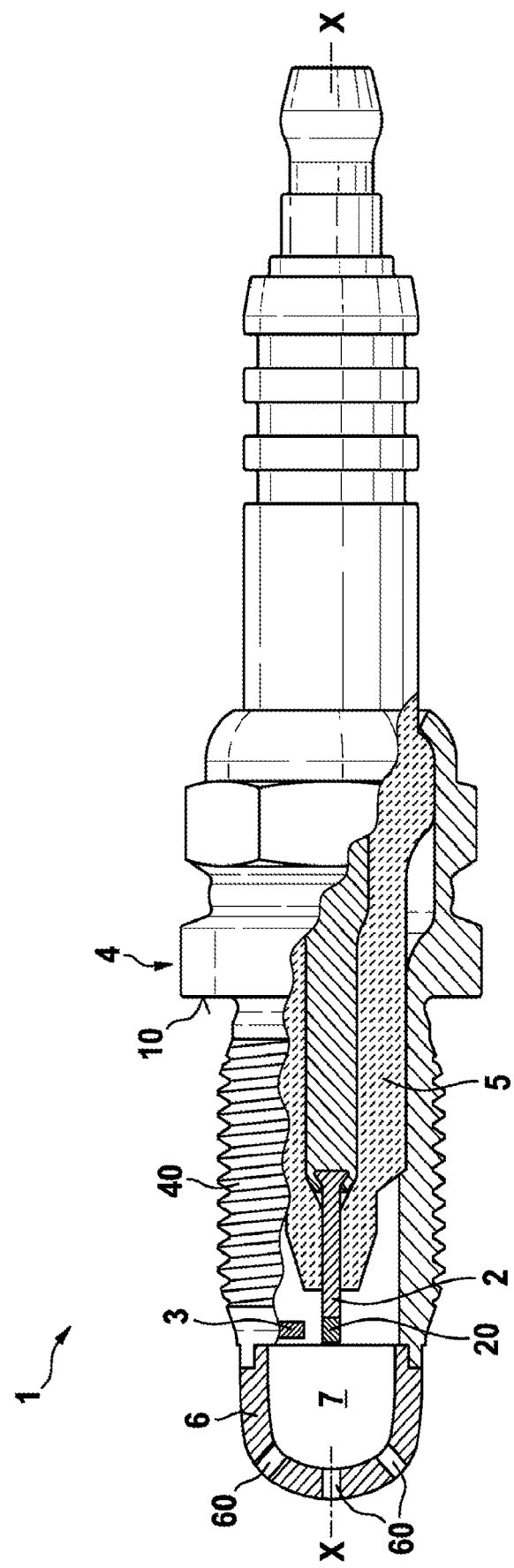
FIG. 1 shows a schematic, partially sectional view of a prechamber spark plug according to a preferred embodiment example of the present invention.

A prechamber spark plug 1 according to a first embodiment example of the present invention is described in detail in the following with reference to FIGS. 1 and 2.

The prechamber spark plug 1 comprises a center electrode 2 and a ground electrode 3. A noble metal pin 20 is disposed on the center electrode 2. It should be noted here that a noble metal pin can also be disposed on the ground electrode 3.

The prechamber spark plug 1 also comprises a housing 4, in particular made of a metallic material, and an insulator 5. The insulator 5 is configured to electrically insulate the center electrode 2 from the housing 4.

An external thread 40 is provided on the housing 4 as well. The external thread 40 has a thread length 11, which extends from a first end 4a, which faces in the direction of a combustion chamber of an internal combustion engine, to an abutment surface 10 on the housing 4 (see FIG. 2). The abutment surface 10 is perpendicular to a center axis X-X of the prechamber spark plug. To avoid damage to the external thread, a peripheral groove 10a is provided between the external thread 40 and the abutment surface 10.

The prechamber spark plug 1 also comprises a cap 6 (see FIG. 1). A plurality of cap holes 60 are configured in the cap 6 to, on the one hand, enable gas exchange in a prechamber 7 and, on the other hand, to allow torch jets to exit the prechamber 7 into a combustion chamber of an internal combustion engine for a main ignition of a gas mixture. The prechamber 7 is thus defined by the cap 6 and parts of the housing 4. The center electrode 2 and the ground electrode 3 are disposed in the prechamber 7.

Figure 2:
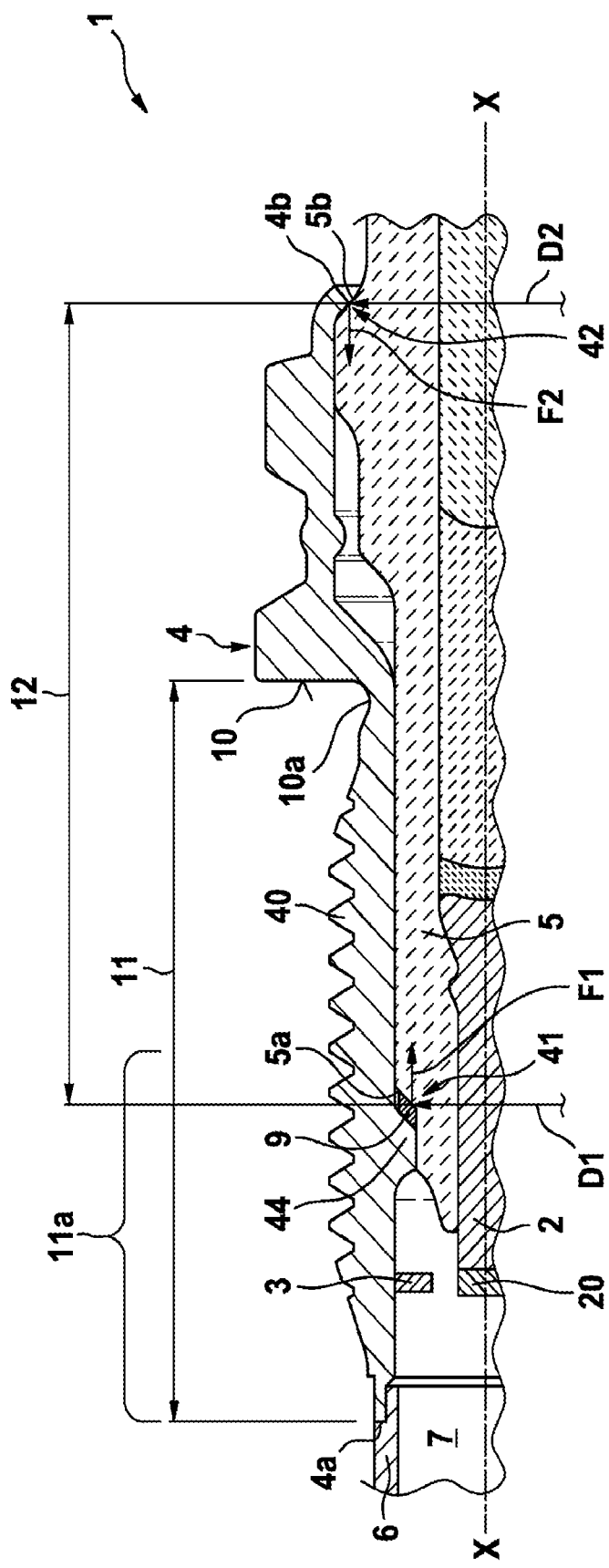
FIG. 2 shows a schematic partial sectional view of the prechamber spark plug of FIG. 1.

As can be seen in particular from FIG. 2, the housing 4 is fastened to the insulator 5 at a first fixing region 41 and a second fixing region 42. The fastening of the housing 4 is such that a first clamping force F1 at the first fixing region 41 acts from the housing 4 on the insulator 5 and a second clamping force F2 at the second fixing region 42 acts from the housing 4 on the insulator 5. The two clamping forces F1, F2 are directed in opposite directions to one another in the axial direction X-X of the prechamber spark plug 1. The two clamping forces F1, F2 are preferably equal.

A first slope 5a is furthermore provided on the insulator at the first fixing region 41 and a second slope 5b is provided on the second fixing region 42. As can be seen from FIG. 2, the slopes are configured oppositely to one another and are preferably configured at a 45° angle.

The two clamping forces F1, F2 thus achieve a pretensioning of the housing 4 on the insulator 5, as a result of which the housing 4 tends to widen radially outward. Therefore, in the assembled state of the prechamber spark plug 1, when it is screwed into a cylinder head, an improved seal between an outer perimeter of the prechamber spark plug 1 and the cylinder head is achieved. Furthermore, due to the stiff spring characteristic of the housing, high surface pressures act on a sealing element 9 disposed between the housing 4 and the insulator 5 when the clamping length is small. The sealing element 9 is disposed on a side of the housing 4 facing away from the combustion chamber and is protected from very hot gases by a radially inward facing flange 44.

A distance between the first fixing region 41 and the second fixing region 42 moreover defines a clamping length 12 of the housing. The pretensioning is thus generated in the region of the clamping length 12 of the housing. A ratio V between the thread length 11 and the clamping length 12 is now furthermore in a range of 0.7 to 1.3. The ratio between the thread length 11 and the clamping length 12 is particularly preferably in a range of 0.8 to 1.2 and further preferably in a range of 0.8 to 1. It is further preferred that the ratio between the thread length 11 and the clamping length 12 is less than 1, i.e., the thread length 11 is less than the clamping length 12, and a lower limit is at a value of 0.7.

The first fixing region 41 is disposed on a first diameter D1 and the second fixing region 42 is disposed on a second diameter D2. The first diameter D1 is smaller than the second diameter D2.

This combination of the measures of selecting the thread length 11 and the clamping length 12 and the provision of a pretensioning on the housing 4 thus makes it possible to achieve an improved robustness and in particular tightness of the prechamber spark plug 1. The clever selection of the thread length 11 and the clamping length 12 moreover enables a significantly improved cooling of the prechamber spark plug 1 during operation, so that, thanks to moderate electrode temperatures, a long service life is possible.

Since the temperatures at the electrodes are significantly reduced compared to the previously existing prechamber spark plugs, there is also greater freedom when selecting a material for the electrodes, so that reduced costs for the electrodes are possible. Providing the pretensioning at the first and second fixing region between the housing 4 and the insulator 5 moreover ensures that improved internal tightness of the prechamber spark plug 1 is achieved over its entire service life. The selection of the lengths of the thread length 11 and the clamping length 12 also has a positive impact on incorrect assembly, for example when tightening the prechamber spark plug 1 with too high a torque, because the clever selection of the lengths makes it possible to prevent damage to the prechamber spark plug 1 if the tightening torque is too high.

Particularly preferred ratios V of thread length to clamping length can be obtained depending on a thread diameter of the external thread 40, as shown as examples in the table below:

| External thread diameter | Thread length/clamping length | Ratio V |
|---|---|---|
| M10 | 26.5/30 | 0.83 |
| M12 | 26.5/27 | 0.98 |
| M14 | 25.0/25.0 | 1.0 |

The measure according to the present invention on the prechamber spark plug 1 thus makes it possible to achieve a significantly improved service life and reduced temperatures during operation on components of the prechamber spark plug 1, in particular the electrodes. The prechamber spark plug 1 according to the present invention is therefore in particular suitable for internal combustion engines in the stationary or mobile sector and in the field of motor sports.

The invention claimed is:

1. A prechamber spark plug, comprising:
    a center electrode;
    a ground electrode;
    a housing having an external thread;
    a cap disposed on the housing and together with the housing defines a prechamber; and
    an insulator which electrically insulates the center electrode from the housing;
    wherein the external thread of the housing has a thread length in an axial direction of the prechamber spark plug;
    wherein the housing is fastened to the insulator at a first fixing region and a second fixing region such that a first clamping force at the first fixing region acts from the housing on the insulator, and a second clamping force at the second fixing region acts from the housing on the insulator, wherein the first and second clamping forces are directed in opposite directions to one another in the axial direction;
    wherein a distance between the first fixing region and the second fixing region in the axial direction defines a clamping length; and
    wherein a ratio between the thread length and the clamping length is in a range of 0.7 to 1.3.

2. The prechamber spark plug according to claim 1, wherein the ratio between the thread length and the clamping length is in a range of 0.8 to 1.2.

3. The prechamber spark plug according to claim 1, wherein the ratio between the thread length and the clamping length is in a range of 0.8 to 1.0.

4. The prechamber spark plug according to claim 1, wherein the first clamping force is equal to the second clamping force.

5. The prechamber spark plug according to claim 1, wherein the insulator includes a first slope at the first fixing region and a second slope at the second fixing region.

6. The prechamber spark plug according to claim 1, wherein the first fixing region is disposed on a smaller diameter than the second fixing region.

7. The prechamber spark plug according to claim 1, further comprising:
    a sealing element disposed between the housing and the insulator near the prechamber.

8. The prechamber spark plug according to claim 7, wherein the sealing element is disposed on a side of a radially inward facing flange which faces away from a combustion chamber.

9. The prechamber spark plug according to claim 7, wherein the sealing element is disposed at the first fixing region.

10. The prechamber spark plug according to claim 8, wherein an abutment surface of the flange is beveled in a direction of an end of the prechamber spark plug which faces away from a combustion chamber.

11. The prechamber spark plug according to claim 1, wherein the first fixing region is located in the axial direction starting from the prechamber in a first half of the thread length.

12. The prechamber spark plug according to claim 1, wherein the thread length extends from a first end of the housing, on which the cap is fastened to the housing, to an abutment surface of the housing, wherein the abutment surface is configured for abutment against an external component.

13. An internal combustion engine, comprising:
    a prechamber spark plug, including:
        a center electrode;
        a ground electrode;
        a housing having an external thread;
        a cap disposed on the housing and together with the housing defines a prechamber; and
        an insulator which electrically insulates the center electrode from the housing;
        wherein the external thread of the housing has a thread length in an axial direction of the prechamber spark plug;
        wherein the housing is fastened to the insulator at a first fixing region and a second fixing region such that a first clamping force at the first fixing region acts from the housing on the insulator, and a second clamping force at the second fixing region acts from the housing on the insulator, wherein the first and second clamping forces are directed in opposite directions to one another in the axial direction;
        wherein a distance between the first fixing region and the second fixing region in the axial direction defines a clamping length; and
        wherein a ratio between the thread length and the clamping length is in a range of 0.7 to 1.3.

* * * * *